United States Patent
Goyot et al.

(10) Patent No.: US 11,162,868 B2
(45) Date of Patent: Nov. 2, 2021

(54) VACUUM TOILET SYSTEM WITH LEAK DETECTION MEANS

(71) Applicant: ALSTOM Transport Technologies, Saint-Ouen-sur-Seine (FR)

(72) Inventors: Aurelien Goyot, Saint-Germain-sur-Morin (FR); Ouadie Hmad, Cesson (FR)

(73) Assignee: ALSTOM TRANSPORT TECHNOLOGIES, Saint-Ouen (FR)

( * ) Notice: Subject to any disclaimer, the term of this patent is extended or adjusted under 35 U.S.C. 154(b) by 0 days.

(21) Appl. No.: 16/847,278

(22) Filed: Apr. 13, 2020

(65) Prior Publication Data

US 2020/0333211 A1    Oct. 22, 2020

(30) Foreign Application Priority Data

Apr. 19, 2019 (FR) ...................................... 1904210

(51) Int. Cl.
*G01M 3/32* (2006.01)
*B60R 15/04* (2006.01)
*B61D 35/00* (2006.01)

(52) U.S. Cl.
CPC .............. *G01M 3/32* (2013.01); *B60R 15/04* (2013.01); *B61D 35/007* (2013.01)

(58) Field of Classification Search
CPC ........................................................ G01M 3/32
USPC ...................................................... 4/458, 449
See application file for complete search history.

(56) References Cited

U.S. PATENT DOCUMENTS

2018/0023275 A1    1/2018  Getmann et al.

FOREIGN PATENT DOCUMENTS

| CN | 201859046 U | 6/2011 |
| CN | 106644304 A | 5/2017 |
| WO | 2011094237 A2 | 8/2011 |
| WO | 2017129862 A1 | 8/2017 |

OTHER PUBLICATIONS

INPI Rapport de Recherche Préliminaire for Patent Application No. FR 1904210, Dec. 17, 2019, 2 pp.
EPO Rapport de Recherche Europeenne for Patent Application No. EP 20169847, Sep. 18, 2020, 7 pp.

*Primary Examiner* — Lori L Baker
(74) *Attorney, Agent, or Firm* — Soquel Group LLC

(57) ABSTRACT

A vacuum toilet system including a toilet bowl, a wastewater tank under vacuum, an ejection valve for ejecting air from the wastewater tank, means for monitoring the frequency of activation of the ejection valve, and a sensor for activating the ejection valve.

10 Claims, 4 Drawing Sheets

US 11,162,868 B2

VACUUM TOILET SYSTEM WITH LEAK DETECTION MEANS

CROSS-REFERENCE TO RELATED APPLICATIONS

This application claims priority of French Patent Application No. 19 04210, filed on Apr. 19, 2019.

FIELD OF THE INVENTION

The present invention relates to a vacuum toilet system, in particular intended to equip a public transport vehicle, such as a rail vehicle.

BACKGROUND OF THE INVENTION

Already known in the prior art is a vacuum toilet system that comprises a toilet bowl, a wastewater tank under vacuum, and a relief valve interposed between the toilet bowl and the wastewater tank. When the relief valve is open, the effluent from the toilet bowl is sucked into the wastewater tank. The system also includes an air ejection valve contained in the wastewater tank, in particular allowing the vacuum in the wastewater tank to be re-established after activation of the relief valve.

In some cases, the seal in the toilet system may deteriorate, so that leaks may occur that affect the maintenance of the vacuum in the wastewater tank. Such leaks may cause the vacuum toilet system to shut down.

SUMMARY OF THE DESCRIPTION

The object of the invention is, in particular, to remedy this drawback, by making it possible to avoid impromptu decommissioning of the vacuum toilet system.

To this end, the invention particularly relates to a vacuum toilet system, including:
  a toilet bowl,
  a wastewater tank under vacuum, and
  an air ejection valve, suitable for evacuating the air contained in the wastewater tank,
characterized in that it includes means for monitoring the frequency of activation of the ejection valve, and includes a sensor detecting the activation of the ejection valve.

In the event of a leak in the system, the vacuum is regularly re-established in the wastewater tank, by activating the air ejection valve. Thus, the air ejection valve is activated more often when the leak becomes significant.

The ejection valve activation sensor makes it possible to monitor the number of activations of the air ejection valve, and to deduce therefrom the presence of a leak if the activation frequency of the ejection valve exceeds a first predefined value.

Optionally, the vacuum toilet system may include:
  a relief valve interposed between the toilet bowl and the wastewater tank, the relief valve comprising a pipe and a member opening/closing the pipe, wherein the opening/closing member may be moved between an open position, in which it allows the passage of a fluid flowing in the pipe, and a closed position in which the pipe is closed off; the relief valve further includes at least one seal interacting with the opening/closing member to ensure tightness in the closed position,
  an activation control member for the relief valve,
  a pressure sensor arranged to measure the pressure in the wastewater tank, and
  a calculator for calculating an integral of the evolution of the pressure in the wastewater tank for a predefined period following the activation of the relief valve.

Preferably, the opening/closing member is a ball disposed in the pipe and pierced through its center by a through opening, the ball being able to rotate about an axis perpendicular to the opening between an open position where the opening communicates with the pipe, and a closed position where the opening does not communicate with the pipe, wherein the at least one seal interacts with the pierced ball to ensure tightness in the closed position.

The ball of the relief valve is in permanent contact with the seals, so that it generates friction against the seals when it rotates. This friction causes the seals to wear thus degrading the functioning of the toilet system, until the toilet system malfunctions when the wear of the seals becomes too great.

The pressure sensor makes it possible to study the behavior of the pressure in the wastewater tank during the activation of the relief valve, in particular by calculating the integral of the evolution of the pressure in the wastewater tank for a predefined period following the activation of the relief valve.

The present invention highlights the fact that, when the value of this integral is greater than a second predefined value by a predefined number of times, and wherein said activation frequency of the air ejection valve simultaneously exceeds said first predefined value, resulting in leakage via the seals that will have to be replaced.

Therefore, by combining the activation sensor and the pressure sensor, the invention makes it possible to carry out a diagnosis of the source of a leak, so that a technician may replace the seals as convenient prior to accidental decommissioning of the toilet system.

A toilet system according to the invention may include one or more of the following characteristics, taken alone or in any technically feasible combination:
  The activation sensor is a voltage sensor.
  The vacuum toilet system includes an air outlet connected to the air ejection valve, and an odor filter arranged between the wastewater tank and the air outlet, the pressure sensor being arranged upstream of the odor filter.

The invention also relates to a method for detecting leaks in a toilet system under vacuum according to any one of the preceding embodiments, characterized in that it includes monitoring of the frequency of activation of the air ejection valve via the activation sensor, wherein a leak is identified when the activation frequency exceeds a first predefined value.

A leak detection method according to the invention may include one or more of the following characteristics, taken alone or in any technically feasible combination:
  The leak detection method may include: monitoring the pressure in the wastewater tank by means of the pressure sensor, and, when the activation control member is activated, calculating an integral of the evolution of the pressure in the wastewater tank during a predefined period following the activation of the relief valve, the seals being considered to be worn when this calculated integral exceeds a second predetermined value by a predefined number of times, and that the activation frequency exceeds the first predefined value.
  The leak detection method includes a preliminary step of characterizing the second value using new seals, which includes activation of the activation control member a significant number of times, and calculation of the corresponding integral for each activation, so as to obtain an interval comprising all the calculated integrals, the second value being chosen to be greater than or equal to an upper limit of this interval.

The first predefined value lies between one activation every 60 seconds and one activation every 5 seconds.

Finally, the invention relates to a public transport vehicle, characterized in that it includes at least one cubicle equipped with a toilet system under vacuum as defined above.

BRIEF DESCRIPTION OF THE DRAWINGS

The invention will be better understood upon reading the description which follows, given solely by way of example and made with reference to the appended figures, among which.

DETAILED DESCRIPTION

Figure 1:
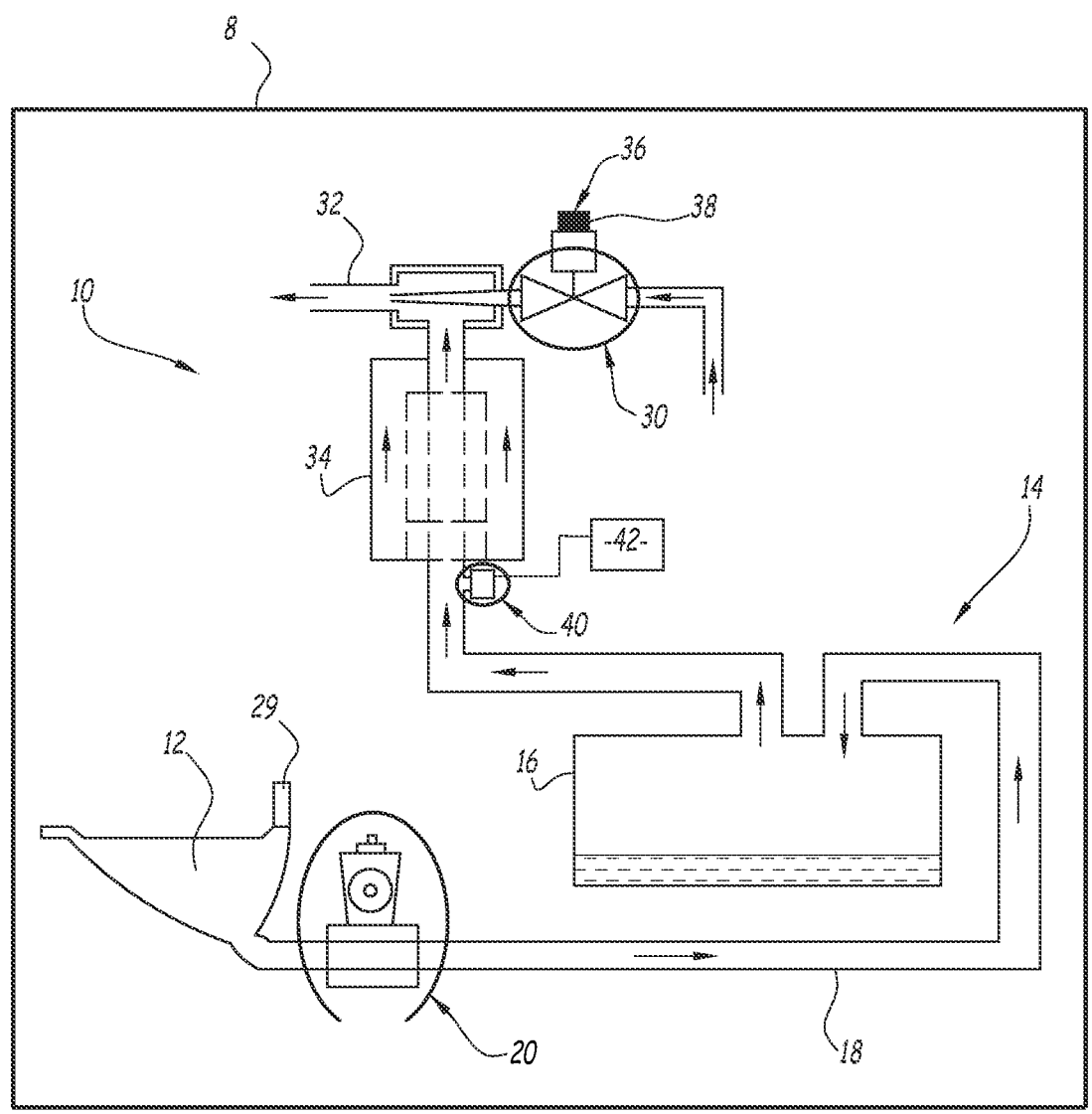
FIG. 1 schematically shows a toilet system according to an exemplary embodiment of the invention.

FIG. 1 shows a system 10 of vacuum toilets according to an exemplary embodiment of the invention. Toilet system 10 is, for example, intended to equip a public car, on particular a public transport vehicle 8, and, more particularly, a rail vehicle.

Toilet system 10 is arranged in a conventional toilet cubicle, which will not be described in detail. This toilet cubicle may include any suitable equipment that may be envisaged.

Toilet system 10 includes a toilet bowl 12 connected to a discharge device 14 for discharging effluents.

Discharge device 14 includes a wastewater tank 16 under vacuum, connected to toilet bowl 12 via a pipe 18.

Discharge device 14 also includes a relief valve 20 interposed between toilet bowl 12 and wastewater tank 16 on pipe 18.

Figure 2:
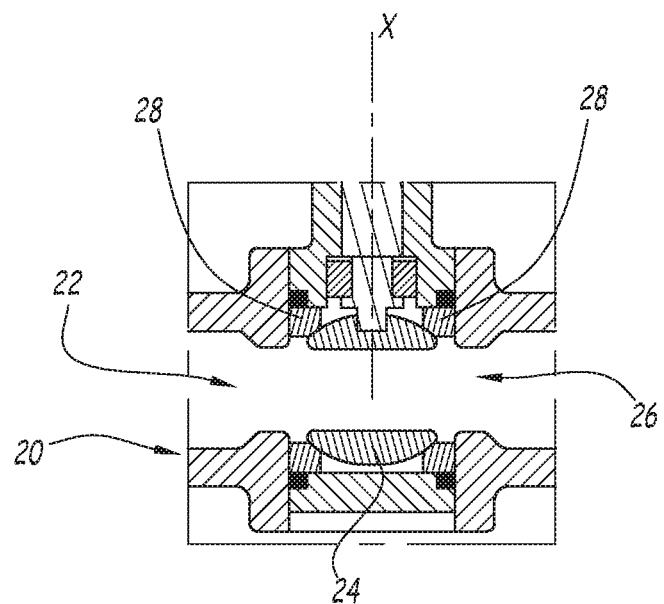
FIG. 2 shows a sectional view of a relief valve fitted to the toilet system of FIG. 1.

Relief valve 20 shown in more detail in FIG. 2, includes a pipe 22 and a member 24 for opening/closing pipe 22. Opening/closing member 24 may be moved between an open position, in which it allows the passage of a fluid flowing in pipe 22, and a closed position, in which pipe 22 is closed. Relief valve 20 further includes at least one seal 28 interacting with opening/closing member 24 to ensure tightness in the closed position.

In the example described, opening/closing member 24 is in the form of a ball, housed in pipe 22, and pierced through its center by a through opening 26. Pipe 22 communicates on either side with pipeline 18.

The pierced ball is rotatable about an axis X perpendicular to opening 26, between an open position where opening 26 communicates with pipe 22 (as shown in FIG. 2), and a closed position where opening 26 does not communicate with pipe 22.

Relief valve 20 further includes at least one seal 28, preferably two seals 28, interacting with the pierced ball to ensure tightness of the closed position.

Relief valve 20 is conventional and will not be described in more detail.

Relief valve 20 is activated by means of an activation control member 29 present in the toilet cubicle, for example a conventional flush control.

Wastewater tank 16 is maintained under vacuum, for example at a pressure substantially equal to −40 kPA (i.e., 40 kPA below atmospheric pressure). To this end, toilet system 10 includes an ejection valve 30 for ejecting air contained in wastewater tank 16. Ejection valve 30 is automatically activated in a conventional manner as soon as the pressure in wastewater tank 16 becomes greater than a first predefined threshold, for example greater than −38 kPA.

When activated, ejection valve 30 extracts aft from wastewater tank 16 until the pressure in wastewater tank 16 drops below a second predefined threshold, for example −42 kPA. The extracted air is then evacuated via an air outlet 32.

Advantageously, and anti-odor Miter is arranged between wastewater tank 16 and air outlet 32. Anti-odor filter 34 is of a conventional type and includes a non-return valve preventing return of air to wastewater tank 16.

Toilet system 10 according to the invention includes means 36 for monitoring the frequency of activation of ejection valve 30, and includes an activation sensor 38 for detecting the activations of ejection valve 30. Activation sensor 38 is intended to detect each time ejection valve 30 is activated. For example, activation sensor 38 may be a voltage sensor.

Monitoring means 36 measure frequency of activation of ejection valve 30, expressed as the number of activations per unit of time.

Ejection valve 30 is activated when the following events occur:

a) When the activation control member of relief valve 20 is activated. Relief valve 20 is then opened, so that effluents from toilet bowl 12 are sucked towards wastewater tank 16. Inevitably, air is also sucked in, causing the pressure in wastewater tank 16 to increase Ejection valve 30 is then activated to reduce the pressure to the desired level.

b) The wastewater tank, and/or the pipes, sometimes have slight leaks. The pressure in the wastewater tank may then increase above the triggering threshold of ejection valve 30. These leaks are generally accepted, and cause activations of the ejection valve with a first frequency, generally of about one activation every 60 seconds, on average.

c) In the event of a larger leak requiring the intervention of a technician, the pressure in the wastewater tank rises above the triggering threshold of ejection valve 30 much more often. Such leaks cause activation of ejection valve 30 with a second frequency, generally around one activation every 5 seconds, on average.

When designing toilet system 10 according to the invention, a first predetermined value should be defined that would indicate that there is a leak in toilet system 10 when monitoring means 36 determine that the frequency of activation of the ejection valve is greater than this first predetermined value. This first predetermined value generally lies between the first frequency and the second frequency defined above, according to the desired tolerance for leaks. The first predetermined value may be set, for example, between 1 activation every 60 seconds and 1 activation every 5 seconds.

In order to diagnose the origin of the leak, in particular if it comes from seals 28, toilet system 10 includes a pressure sensor 40 arranged to measure the pressure in wastewater tank 16, along with a calculator 42 to calculate an integral of the evolution of the pressure in wastewater tank 16 for a predefined period following activation of relief valve 20.

In the example described, pressure sensor 40 is disposed between wastewater tank 16 and odor filter 34.

For example, the predefined duration may be approximately 20 seconds, which usually corresponds to the time necessary to return to normal pressure in wastewater tank 16 following activation of relief valve 20.

Figure 3:
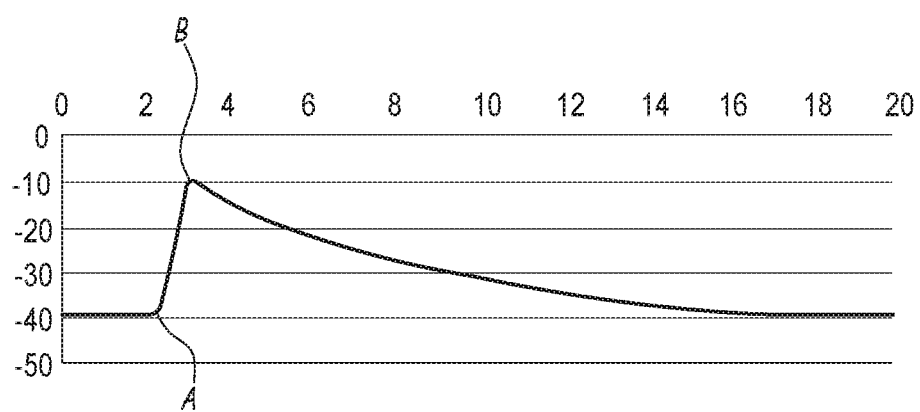
FIG. 3 shows a graph representing the evolution of the pressure in a wastewater tank of the toilet system of FIG. 1, when the relief valve is activated.

This evolution of the pressure in wastewater tank 16 is shown in FIG. 3 for a predefined period following activation of relief valve 20. In this figure, the abscissa axis represents the time in seconds, while the ordinate axis represents the pressure in kPA (the pressure 0 corresponding to the reference pressure, generally atmospheric pressure).

The curve of FIG. 3 is obtained with new seals 28.

During activation of relief valve 20 (point A), the pressure in wastewater tank 16 increases suddenly due to the suction of air into wastewater tank 16, until it reaches, for example −10 kPA (at point B).

Air ejection valve 30 is then activated as the pressure is greater than its triggering threshold, so as to eject the air from wastewater tank 16, until the pressure returns to its initial value (−40 kPA), generally between 14 and 20 seconds after activation of relief valve 20.

The integral of the evolution of the pressure may be determined, for example, by calculating the area between the curve of FIG. 3 and the abscissa axis over a predefined interval, for example 20 seconds after activation of relief valve 20. This integral calculation is carried out by a computer in a manner known per se.

In the event of a leak via seals 28, the time required for the pressure to return to normal is longer, so that the calculated integral is greater than that calculated with new seals.

Thus, it may be assumed that the seals are worn when the calculated integral is greater than a second predetermined value by a predefined number of times, for example 3 times out of 5 consecutive activations of relief valve 20.

This second predetermined value is characterized beforehand, when the seals are new, by activating the activation control member a significant number of times, and by noting, for each activation, the calculation of the corresponding integral, so as to obtain an interval including all calculated integrals. The second value is then chosen to be greater than, or equal to, an upper limit of this interval.

The larger the chosen second value, the more significant will be the wear tolerated on the seals, before intervention for their replacement.

Figure 4:
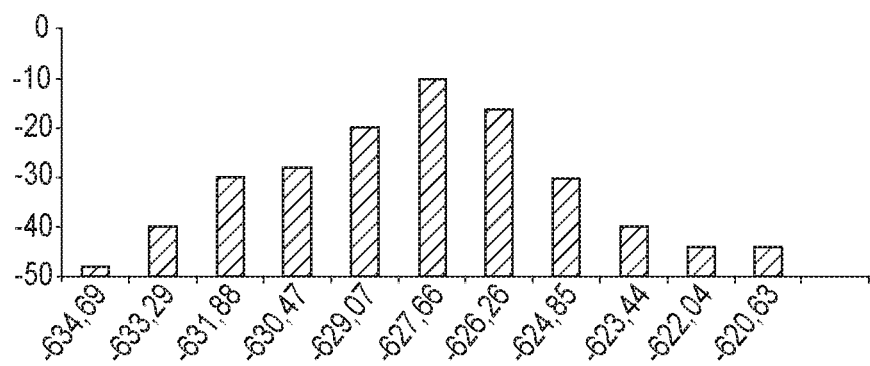
FIG. 4 represents the distribution of a plurality of integrals of the evolution of the pressure during activations of the relief valve, showing the number of occurrences of this value for each integral value obtained.

By way of example, FIG. 4 represents the distribution of a plurality of integrals of the evolution of the pressure during activations of the relief valve. In this figure, the abscissa axis gives the value of the calculated integrals, while the ordinate axis gives, for each interval of given integrals, the number of occurrences of calculated integrals in this interval.

According to this figure, a second value greater than −620.63 kPa·s is chosen.

A method of detecting leaks in toilet system 10 as previously described will now be described.

The method includes a preliminary step of characterizing the second value using new seals and comprising the activation of the activation control member a significant number of times, wherein the corresponding integral is calculated for each activation, so as to obtain an interval including all the calculated integrals, the second value being chosen greater than, or equal to, an upper limit of this interval.

The method furthermore includes continuous verification of the frequency of activation of ejection valve 30 by means of the activation sensor, wherein a leak is identified when the frequency of activation exceeds a first predefined value. For example, the first predefined value may be 1 activation every 5 seconds.

The method also includes monitoring the pressure in the wastewater tank by means of the pressure sensor, and, when the activation control member is activated, calculating an integral of the evolution of the pressure in the wastewater tank for a predefined period following activation of the relief valve.

The seals are considered to be worn when this calculated integral exceeds the second predetermined value by a predefined number of times (for example, 3 times during 5 activations in a row), and when the frequency of activation exceeds the first preset value.

In this case, an alert may be issued to warn that intervention by a technician is required to replace the seals.

It should be noted that the invention is not limited to the embodiment described above, but could present various complementary variants without departing from the scope of the claims.

The invention claimed is:

1. A vacuum toilet system, comprising:
a toilet bowl;
a wastewater tank under vacuum;
an air ejection valve capable of evacuating the air contained in said wastewater tank;
a monitoring device for monitoring the frequency of activation of said air ejection valve;
an activation sensor for detecting activations of said air ejection valve.

2. The vacuum toilet system according to claim 1, wherein said activation sensor is a voltage sensor.

3. The vacuum toilet system according to claim 1, further comprising:
a relief valve interposed between said toilet bowl and said wastewater tank, comprising:
a pipe;
an opening/closing member for opening/closing said pipe, the opening/closing member being movable between an open position, in which it allows passage of a fluid flowing in said pipe, and a closed position, in which said pipe is closed; and
at least one seal interacting with said opening/closing member to ensure tightness in the closed position;
a control member for activating said relief valve;
a pressure sensor arranged to measure the pressure in said wastewater tank; and
a calculator for calculating an integral of the evolution of the pressure in said wastewater tank for a predefined period following activation of said relief valve.

4. The vacuum toilet system according to claim 3, wherein said opening/closing member comprises a ball arranged in said pipe and pierced in its center by a through-opening, the ball being rotatable about an axis perpendicular to the through-opening, and between the open position where the through-opening communicates with said pipe, and the closed position where the through-opening does not communicate with said pipe, said at least one seal interacting with the ball to ensure tightness in the closed position.

5. The vacuum toilet system according to claim 3, further comprising:
an air outlet connected to said air ejection valve; and an odor filter disposed between said wastewater tank and said air outlet, said pressure sensor being arranged upstream of the odor filter.

6. A method for detecting leaks in a vacuum toilet system comprising a toilet bowl, a wastewater tank under vacuum, an air ejection valve capable of evacuating the air contained in the wastewater tank, a monitoring device for monitoring the frequency of activation of the air ejection valve, and an activation sensor for detecting activations of the air ejection valve, the method comprising:
 checking, by the activation sensor, the frequency of activation of the air ejection valve; and
 identifying a leak when the frequency of activation exceeds a first predefined value.

7. The method for detecting leaks according to claim 6, wherein the vacuum toilet system further comprises a relief valve interposed between the toilet bowl and the wastewater tank, the relief valve comprising a pipe, an opening/closing member for opening/closing the pipe, the opening/closing member being movable between an open position, in which it allows the passage of a fluid flowing in the pipe, and a closed position, in which the pipe is closed, and at least one seal interacting with the opening/closing member to ensure tightness in the closed position, a control member for activating the relief valve, a pressure sensor arranged to measure the pressure in the wastewater tank, and a calculator for calculating an integral of the evolution of the pressure in the wastewater tank for a predefined period following activation of the relief valve, the method further comprising:
 monitoring the pressure in the wastewater tank using the pressure sensor;
 when the activation control member is activated, calculating an integral of the evolution of the pressure in the wastewater tank for a predefined period following activation of the relief valve; and
 determining that the seals are worn when the calculated integral exceeds a second predetermined value by a predefined number of times, and the activation frequency exceeds the first predefined value.

8. The method for detecting leaks according to claim 7, further comprising determining the second predetermined value using new seals, comprising:
 activating the activation control member a significant number of times;
 calculating the corresponding integral for each activation, so as to obtain an interval comprising all of the calculated integrals; and
 choosing the second predetermined value to be greater than or equal to an upper limit of this interval.

9. The method for detecting leaks according to claim 6, in which the first predefined value lies between one activation per 60 seconds and one activation per 5 seconds.

10. A public transport vehicle, comprising at least one cubicle equipped with a vacuum toilet system comprising:
 a toilet bowl;
 a wastewater tank under vacuum;
 an air ejection valve capable of evacuating the air contained in said wastewater tank;
 a monitoring device for monitoring the frequency of activation of said air ejection valve; and
 an activation sensor for detecting activations of said air ejection valve.

* * * * *